(12) United States Patent
Schwing

(10) Patent No.: US 11,904,928 B2
(45) Date of Patent: Feb. 20, 2024

(54) METHOD FOR THE UNIFORM HEIGHT ADJUSTMENT OF A STEERING COLUMN OF A MOTOR VEHICLE

(71) Applicant: NIDEC Motors & Actuators (Germany) GmbH, Bietigheim-Bissingen (DE)

(72) Inventor: Max Schwing, Ludwigsburg (DE)

(73) Assignee: NIDEC MOTORS & ACTUATORS (GERMANY) GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/621,586

(22) PCT Filed: Jun. 19, 2020

(86) PCT No.: PCT/EP2020/067115
§ 371 (c)(1),
(2) Date: Dec. 21, 2021

(87) PCT Pub. No.: WO2020/254586
PCT Pub. Date: Dec. 24, 2020

(65) Prior Publication Data
US 2022/0355849 A1 Nov. 10, 2022

(30) Foreign Application Priority Data
Jun. 21, 2019 (DE) .......................... 102019116760.4

(51) Int. Cl.
*B62D 1/181* (2006.01)

(52) U.S. Cl.
CPC .................. *B62D 1/181* (2013.01)

(58) Field of Classification Search
CPC ....................................................... B62D 1/181
See application file for complete search history.

(56) References Cited

U.S. PATENT DOCUMENTS

| 11,338,839 B2 * | 5/2022 | Kurokawa | ................ H02P 6/08 |
| 2004/0244295 A1 | 12/2004 | Derham et al. | |

(Continued)

FOREIGN PATENT DOCUMENTS

| CN | 114954622 A * | 8/2022 | ............. B62D 1/181 |
| DE | 20 2018 104 386 U1 | 10/2018 | |
| DE | 102018128399 A1 * | 5/2020 | ............. B62D 1/181 |

(Continued)

OTHER PUBLICATIONS

Official Communication issued in International Patent Application No. PCT/EP2020/067115, dated Dec. 21, 2021.

(Continued)

*Primary Examiner* — Drew J Brown
(74) *Attorney, Agent, or Firm* — Keating & Bennett, LLP

(57) ABSTRACT

A method of operating a steering column of a motor vehicle, which includes a height adjuster including an electric motor and a controller to control the electric motor to raise and lower along an adjustment path of a steering assembly connected to the steering column. The control is effected by pulse width modulation and, by varying a duty cycle of the pulse width modulation, an electrical voltage is adapted in such a way that the raising and/or lowering is effected over an adjustment path at a constant adjustment speed.

5 Claims, 3 Drawing Sheets

(56) References Cited

U.S. PATENT DOCUMENTS

2015/0226001 A1   8/2015  Adams et al.
2021/0291894 A1*  9/2021  Rouleau ............ B62D 15/0215

FOREIGN PATENT DOCUMENTS

DE    102019004840 A1 *  1/2021   ............ B62D 1/181
JP       2007-110788 A     4/2007
KR       20210000833 A *   1/2021

OTHER PUBLICATIONS

English translation of Official Communication issued in International Patent Application No. PCT/EP2020/067115, dated Sep. 25, 2020.

Official Communication issued in International Patent Application No. PCT/EP2020/067115, dated Sep. 25, 2020.

* cited by examiner

METHOD FOR THE UNIFORM HEIGHT ADJUSTMENT OF A STEERING COLUMN OF A MOTOR VEHICLE

CROSS REFERENCE TO RELATED APPLICATIONS

This is a U.S. national stage of PCT Application No. PCT/EP2020/067115, filed on Jun. 19, 2020, with priority under 35 U.S.C. § 119(a) and 35 U.S.C. § 365(b) being claimed from German Application No. 10 2019 116 760.4, filed Jun. 21, 2019, the entire disclosures of which are incorporated herein by reference.

1. FIELD OF THE INVENTION

The present disclosure relates to a method of operating a steering column of a motor vehicle.

2. BACKGROUND

Steering columns for motor vehicles are known in many different designs. Steering columns in which a steering shaft is rotatably mounted in a jacket tube are generally used. The jacket tube itself is mounted in a box-type rocker arm so that it can be adjusted axially. The box-type rocker arm is in turn pivotably mounted on a bracket to be attached to the vehicle in order to enable height adjustment of the steering wheel.

When adjusting the height of the steering wheel, the weight force causes a counterforce when raising and a corresponding thrust force when lowering. This leads to different adjustment speeds and sounds, which is annoying for the driver of the motor vehicle.

SUMMARY

Example embodiments of the present disclosure provide electrically adjustable steering columns each of which has a uniform sound development independent of a height adjustment direction.

Accordingly, an example embodiment of the present disclosure provides a method of operating a steering column which includes a height adjuster including an electric motor and a controller to control the electric motor to raise and lower along an adjustment path of a steering assembly connected to the steering column and the control is effected by pulse width modulation, wherein by varying a duty cycle of the pulse width modulation (PWM duty cycle) the electrical voltage is adapted in such a way that the raising and/or lowering is effected over the adjustment path at a constant adjustment speed.

The constant speed results in a consistent sound, which is perceived as pleasant for the driver.

In an example embodiment of the present disclosure, initialization takes place during initial start-up of the height adjuster, includes moving the height adjuster from an uppermost end position to a lowermost end position and back with a constant duty factor and determining a load condition of the electric motor, and determining, depending on the load curve, a duty factor of the pulse width modulation to control the electric motor depending on the position of the height adjuster and the adjustment direction to adjust the steering assembly with a constant adjustment speed.

The running characteristics of the height adjuster are thus quantified at the beginning and taken into account in the future adjustment. The values obtained during initialization are preferably used to control the electric motor for the remaining service life of the height adjuster. However, it can also be provided that the measurement of the load state is repeated after, for example, a predetermined time or number of adjustment cycles, in order to take into account wear or other changes in the height adjuster.

It is preferred if the load condition is determined by measuring the current consumption of the electric motor.

The height adjuster is preferably a spindle drive, which includes a worm shaft on the output of the electric motor, the worm shaft being in engagement with a worm wheel. The worm wheel is either non-rotatably coupled to the threaded rod or non-rotatably coupled to a spindle nut. Preferably, the electric motor drives a threaded rod engaged with a spindle nut, wherein a rotational movement of the threaded rod is converted into a translational movement of the spindle nut in the direction of the longitudinal axis of the threaded rod.

It is advantageous if the steering column includes a steering shaft which is rotatably mounted in a jacket tube, the jacket tube itself being mounted in an axially adjustable manner in a guide bracket which is mounted in a holder such that it can pivot about a pivot axis, which holder can be connected to a body of the motor vehicle, and the height adjuster pivoting the guide bracket with respect to the holder in order to raise and lower the steering assembly. In this case, it is preferred if a lever is held pivotably in a hinge axis on the holder and in a hinge axis on the guide bracket, and the electric motor effects pivoting of the guide bracket by the lever.

The above and other elements, features, steps, characteristics and advantages of the present disclosure will become more apparent from the following detailed description of the example embodiments with reference to the attached drawings.

BRIEF DESCRIPTION OF THE DRAWINGS

For a noise level perceived as pleasant by the driver, the frequency of the pulse width modulation is preferably about 21 kHz. In the following, example embodiments of the present disclosure will be described with reference to the drawings. Identical or comparable components in different drawings bear the same reference numerals.

DETAILED DESCRIPTION

Figure 1:
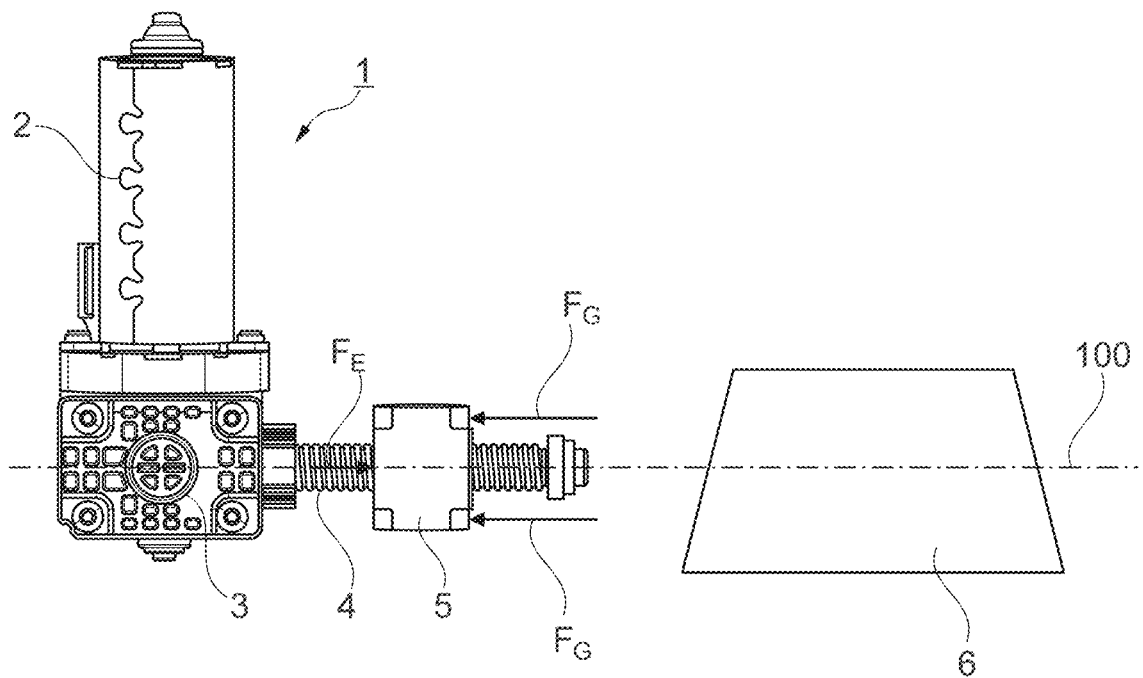
FIG. 1 is a schematic representation of a portion of a height adjustment device of a steering column when the steering wheel is raised.
Figure 2:
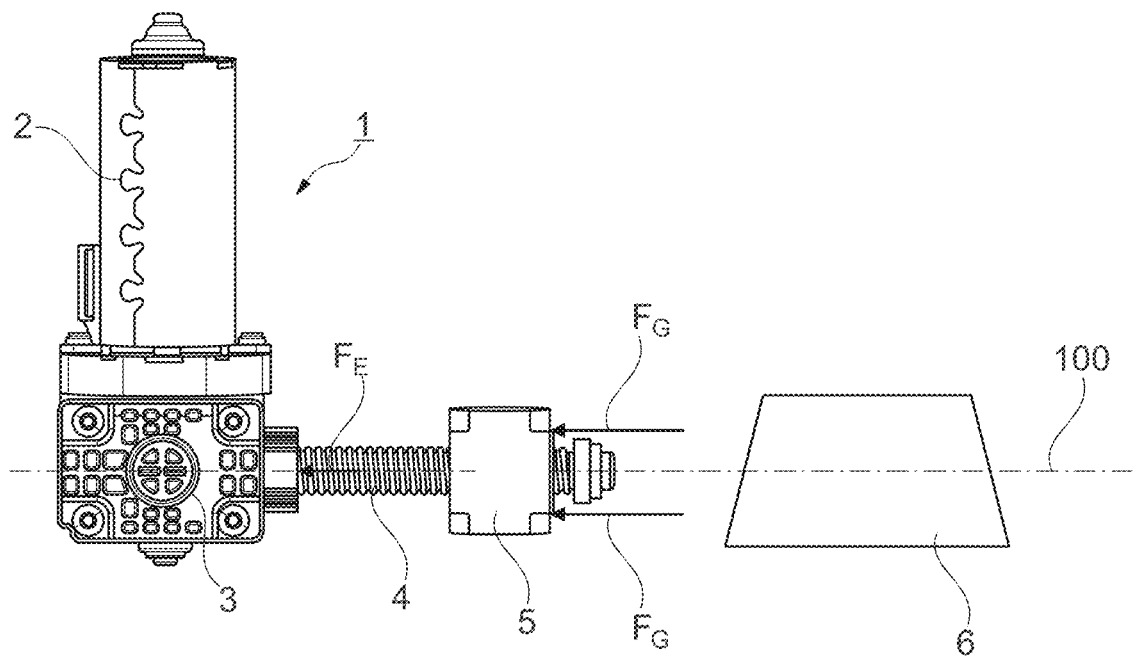
FIG. 2 is a schematic representation of the portion of the height adjustment device of FIG. 1 when the steering wheel is lowered.

FIGS. 1 and 2 show a spatial representation of an actuator 1 with an electric motor 2 and a reduction gear 3 of a height adjustment device of a steering column. The electric motor 2 drives, via the reduction gear 3, a threaded spindle 4 which is engaged with a spindle nut 5. The spindle nut 5 is moved on the threaded spindle 4 along a longitudinal axis 100 by the electric motor 2, wherein the interaction of the threaded spindle 4 and the spindle nut 5 converts the rotational movement of the threaded spindle 4 into a translational movement of the spindle nut 5 in the direction of the longitudinal axis 100 of the threaded spindle 4. The spindle nut 5 is indirectly connected to a steering assembly not shown, in particular a steering wheel, so that a movement of the spindle nut 5 along the longitudinal axis 100 of the threaded spindle 4 results in a height adjustment of the steering wheel. In an example embodiment, a steering shaft connected to the steering wheel is rotatably mounted in a jacket tube. The jacket tube is slidably guided in a guide clamp along the longitudinal axis of the steering shaft. The guide clamp is pivotally mounted about a pivot axis in a bracket or, more generally, a retaining member. The retaining member may be secured in mounting points on a body of a motor vehicle. The spindle nut is connected to the guide clamp, which in turn is connected to the holding portion by a lever, so that a movement of the spindle nut along the longitudinal axis of the threaded spindle leads to pivoting of the guide clamp relative to the holding portion and adjustment of the steering wheel in the height adjustment direction. In one example embodiment, the lever ratio of the lever changes along the adjustment path. It is preferably in a range between 1.3 and 1.6. In the two figures, the weight 6 acting on the height adjustment device is shown purely schematically. The weight results from the steering wheel and in particular other parts of the steering column.

FIG. 1 shows the actuator 1 and illustrates the lifting of the steering wheel. The weight force of the steering wheel and other possible steering column components, in particular the guide bracket and the jacket tube, counteracts the force $F_E$ applied by the electric motor for height adjustment with its vector component $F_G$.

FIG. 2 shows the lowering of the steering wheel. The weight of the steering wheel with its vector component $F_G$ supports the electric motor during the height adjustment. In other words, the electric motor has to apply less torque to achieve the same adjustment speed as when raising.

The electric motor 2 is controlled by a controller (ECU). The control signal is shown in FIG. 3.

Since the load caused by the steering wheel and the possible steering column components changes along the travel path due to the changing lever ratio, different voltage is required at each position of the travel path in order to achieve a constant speed of the height adjustment. In addition, manufacturing tolerances can result in differences in running characteristics between different steering columns/actuators of up to 20%, which must also be taken into account in order to achieve a uniform adjustment speed.

Figure 3:
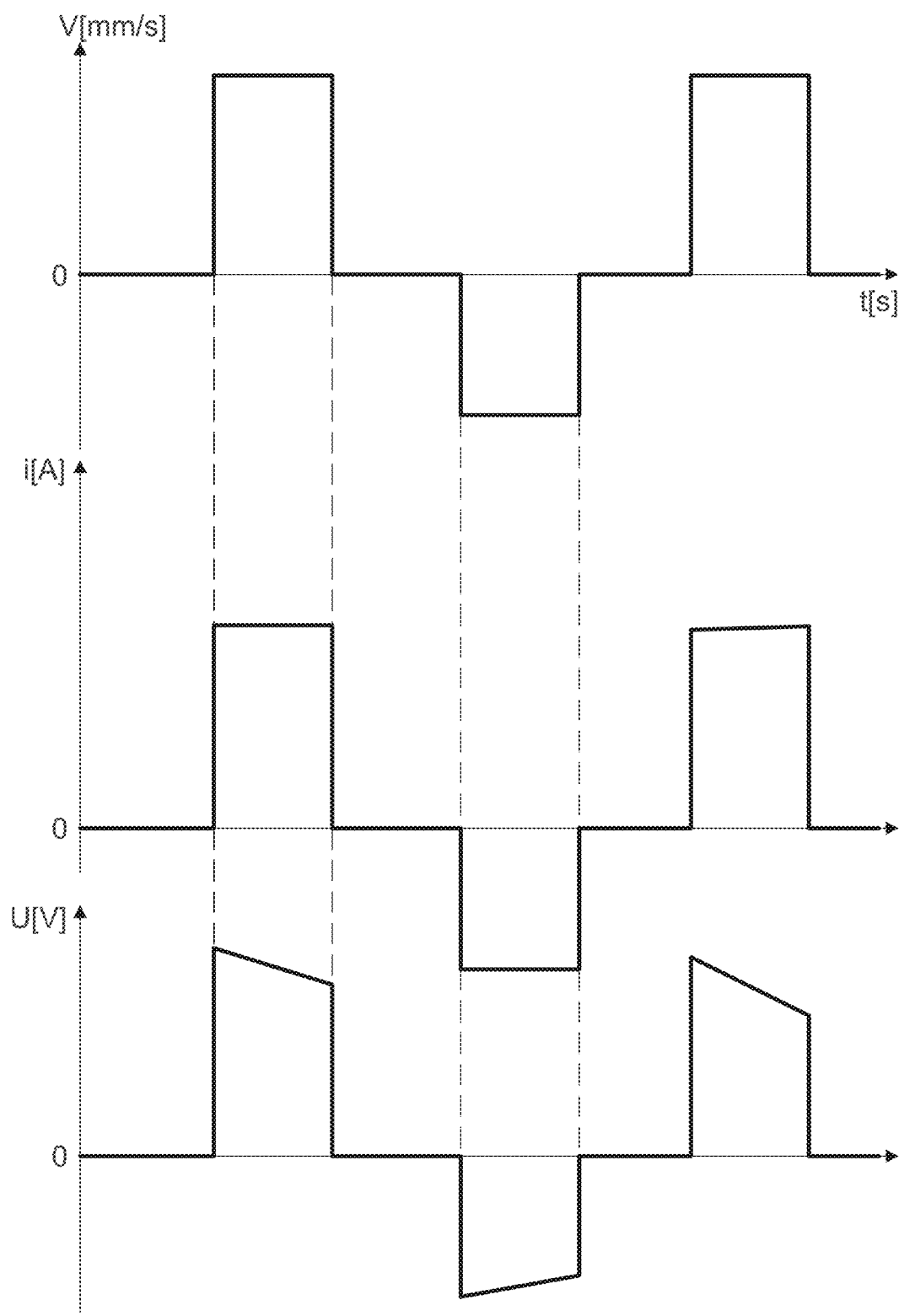
FIG. 3 is the time course of the motor control.

In the upper graph of FIG. 3, the adjustment speed v is plotted against the time s. A positive value of the adjustment speed represents a raising of the steering wheel and a negative value of the adjustment speed represents a lowering of the steering wheel.

A first pass of the height adjustment is used for initialization. The steering wheel is thereby moved from the uppermost end position to the lowermost end position and back with a constant duty factor of the PWM. The load state of the electric motor can be determined by measuring the current consumption in a simple way along the adjustment path. However, it is also possible to measure the torque of the electric motor to determine the load condition.

Depending on the load curve, the duty factor of the PWM is adjusted to achieve a constant adjustment speed. The duty factor indicates the ratio of the pulse duration to the period duration for a periodic sequence of pulses. By varying the duty factor, the DC value of the electrical voltage can be changed. Preferably, an actual duty factor is adapted to a target duty factor. There is a theoretical limit as a function of the maximum available voltage at a setpoint adjustment speed, which can be calculated internally with a motor constant.

The course of the electrical voltage during a height adjustment after initialization is shown in FIG. 3, at the bottom. The weight of the steering wheel counteracts the lifting of the steering wheel. Due to the lever located between the spindle nut and the steering wheel, the load decreases as the steering wheel is raised. The electrical voltage thus decreases along the adjustment path. When the steering wheel is lowered, the weight of the steering wheel supports the electric motor and the load is reduced. The electrical voltage is therefore significantly lower in magnitude than the electrical voltage required during raising. During lowering, the electrical voltage decreases because the weight force acting on the spindle nut in the direction of adjustment increases due to the lever. A frequency around 21 kHz is used for the PWM. The electrical voltage is adapted to the position and the direction of the adjustment by the initialization in such a way that the adjustment speed is the same in magnitude (see FIG. 3, above). The current consumption of the electric motor is then also constant for raising the steering wheel as well as for lowering the steering wheel (see FIG. 3, middle). The values obtained during initialization are preferably used for the remaining service life of the height adjustment drive.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A method of operating a steering column of a motor vehicle including a height adjuster with an electric motor and a controller, the controller driving the electric motor to raise and lower along an adjustment path of a steering assembly connected to the steering column, the method comprising:
   effecting control of the electric motor with the controller by pulse width modulation; and
   adjusting an electrical voltage by varying a duty cycle of the pulse width modulation in such a way that the raising and/or lowering is carried out over the adjustment path at a constant adjustment speed; wherein
   during a first start-up of the height adjuster an initialization includes:
      moving the height adjuster from an uppermost end position to a lowermost end position and back with a constant duty factor and determining a load condition of the electric motor; and
      determining a duty cycle of the pulse width modulation to control the electric motor as a function of a position of the height adjuster and an adjustment direction to adjust the steering assembly at a constant adjustment speed as a function of a load curve.

2. The method according to claim 1, wherein the load condition is determined by measuring a current consumption of the electric motor.

3. The method according to claim 1, wherein values obtained during the initialization are used to control the electric motor and to adjust the electric voltage.

4. The method according to claim 1, wherein
   the electric motor drives a threaded spindle which is in engagement with a spindle nut; and
   a rotational movement of the threaded spindle is converted into a translational movement of the spindle nut in a direction of a longitudinal axis of the threaded spindle.

5. The method according to claim 1, wherein a frequency of the pulse width modulation is about 21 kHz.

* * * * *